US012709689B2

(12) United States Patent
Kang et al.

(10) Patent No.: US 12,709,689 B2
(45) Date of Patent: Aug. 18, 2026

(54) ZINC RICH EPOXY COATING

(71) Applicant: PPG Coatings (Kunshan) Co., Ltd., Jiangsu (CN)

(72) Inventors: Shijie Kang, Jiangsu (CN); Langfeng Fan, Jiangsu (CN); Shaohua Ma, Jiangsu (CN); Ping Jin, Jiangsu (CN)

(73) Assignee: PPG Coatings (Kunshan) Co., Ltd., Jiangsu (CN)

( * ) Notice: Subject to any disclaimer, the term of this patent is extended or adjusted under 35 U.S.C. 154(b) by 580 days.

(21) Appl. No.: 18/254,536

(22) PCT Filed: Nov. 18, 2021

(86) PCT No.: PCT/CN2021/131431
§ 371 (c)(1),
(2) Date: May 25, 2023

(87) PCT Pub. No.: WO2022/111373
PCT Pub. Date: Jun. 2, 2022

(65) Prior Publication Data

US 2024/0018366 A1 Jan. 18, 2024

(30) Foreign Application Priority Data

Nov. 26, 2020 (CN) ......................... 202011349753.5

(51) Int. Cl.

| | |
|---|---|
| ***C09D 5/10*** | (2006.01) |
| ***C09D 7/20*** | (2018.01) |
| ***C09D 7/61*** | (2018.01) |
| ***C09D 163/00*** | (2006.01) |

(52) U.S. Cl.
CPC ............... *C09D 5/106* (2013.01); *C09D 7/20* (2018.01); *C09D 7/61* (2018.01); *C09D 163/00* (2013.01)

(58) Field of Classification Search
CPC . C09D 5/106; C09D 7/20; C09D 7/61; C09D 163/00; C09D 7/69; C09D 7/62; C09D 7/63; C09D 7/65; C09D 7/70; C09D 7/80; C08K 2003/0893; C08K 2003/328; C08L 77/00; C08L 57/02; C08L 2205/025; C08L 2205/03
See application file for complete search history.

(56) References Cited

U.S. PATENT DOCUMENTS

| | | | | | |
|---|---|---|---|---|---|
| 4,476,260 | A | * | 10/1984 | Salensky | C09D 171/00 523/415 |
| 5,098,938 | A | | 3/1992 | Savin | |
| 5,413,628 | A | * | 5/1995 | Savin | C09D 5/106 106/14.44 |
| 6,045,873 | A | * | 4/2000 | Adachi | C09D 5/106 525/530 |
| 2004/0191555 | A1 | | 9/2004 | Germano | |
| 2015/0044450 | A1 | | 2/2015 | Yuasa et al. | |
| 2020/0181429 | A1 | | 6/2020 | Wu et al. | |
| 2021/0363358 | A1 | | 11/2021 | Mayo et al. | |

FOREIGN PATENT DOCUMENTS

| | | | | | |
|---|---|---|---|---|---|
| CN | 101133133 | A | | 2/2008 | |
| CN | 101643612 | A | | 2/2010 | |
| CN | 104140735 | A | | 11/2014 | |
| CN | 104140736 | A | | 11/2014 | |
| CN | 104745044 | A | | 7/2015 | |
| CN | 105086774 | A | | 11/2015 | |
| CN | 105086774 | B | * | 2/2019 | |
| CN | 109535923 | A | | 3/2019 | |
| CN | 111117418 | A | | 5/2020 | |
| CN | 111699224 | A | | 9/2020 | |
| CN | 111748261 | A | | 10/2020 | |
| JP | H08217859 | A | | 8/1996 | |
| JP | H11310735 | A | | 11/1999 | |
| JP | 2000169673 | A | | 6/2000 | |
| JP | 2002069367 | A | | 3/2002 | |
| JP | 2013199546 | A | | 10/2013 | |
| JP | 2015067762 | A | | 4/2015 | |
| JP | 2018053203 | A | | 4/2018 | |
| JP | 2020-523467 | A | | 8/2020 | |
| WO | 2006064712 | A1 | | 6/2006 | |
| WO | 2006/100778 | A1 | | 9/2006 | |
| WO | 2009/141438 | A2 | | 11/2009 | |
| WO | 2014033237 | A1 | | 3/2014 | |
| WO | 2015132366 | A1 | | 9/2015 | |
| WO | 2017129784 | A1 | | 8/2017 | |
| WO | WO-2018060336 | A1 | * | 4/2018 | C08L 83/04 |

(Continued)

OTHER PUBLICATIONS

Zhang, "Synthesis of bio-based epoxy resins derived from itaconic acid and application in rubber wood surface coating," 2024, 222, pp. 1-12 (Year: 2024).*

Combi-Blocks, "Safety Data Sheet, 1,6 Hexanediol Diglycidyl ether, technical grade," 2024, Combi-Blocks, pp. 1-3 (Year: 2024).*

International Search Report and Written Opinion received for PCT Application Serial No. PCT/CN2021/131431 dated Feb. 11, 2022, 7 pages.

Gang, W., "Preparation and performance study of liquid petroleum resin-based waterborne epoxy anticorrosion coating", Coating Industry, vol. 49. No. 5, 2019.

(Continued)

*Primary Examiner* — Robert S Jones, Jr.
*Assistant Examiner* — Joshua Caleb Bledsoe

(57) ABSTRACT

The present disclosure relates to a coating composition, comprising: —a resin component containing an epoxy resin and a petroleum resin; —zinc particles in an amount of at least 65 wt.-%, based on the total solid weight of the coating composition; —a metallic salt of phosphorous acid; and —a hardener. In addition, the present disclosure also relates to a multi-part coating form of said coating composition, a method for preparing the coating composition and a substrate coated with the coating composition.

20 Claims, No Drawings

(56) References Cited

FOREIGN PATENT DOCUMENTS

| | | | |
|---|---|---|---|
| WO | 2018086661 | A1 | 5/2018 |
| WO | 2018/227458 | A1 | 12/2018 |
| WO | 2019020709 | A1 | 1/2019 |
| WO | 2019126527 | A1 | 6/2019 |
| WO | 2020088647 | A1 | 5/2020 |

OTHER PUBLICATIONS

International Preliminary Report on Patentability received for PCT Patent Application No. PCT/CN2021/131431, mailed on Jun. 8, 2023, 6 pages.
Office Action issued on Apr. 19, 2024, in corresponding Japanese application No. 2023-532330 (5 pages), and English translation (6 pages).

* cited by examiner

ZINC RICH EPOXY COATING

TECHNICAL FIELD

The present disclosure relates to an anti-corrosion zinc rich, epoxy resin based coating composition. More specifically, the present disclosure relates to an anti-corrosion coating composition having corrosion resistance, rapid drying and curing rate, and low density.

BACKGROUND

Anti-corrosion coatings are widely used in various industrial fields to protect coated substrates from external erosions, in particular used for protecting iron and steel structures, for example, industrial structures, such as bridges, oil refinery equipment, petrochemical industry production equipment, power plant equipment, storage tanks, cranes, windmills, and steel structural parts of civil buildings and the like.

Such coatings may be based on various resin systems, for example silicates, epoxy resins, polyurethanes, polysiloxanes, alkyd resin and the like.

Moreover, it has been found that some metals, for example zinc, may be added to a primer deposited on the substrate for enhancing the corrosion resistance of the coating. Metals such as zinc can act as a sacrificed anode material to protect the steel or iron substrate, which acts as a cathode.

Coatings having improved corrosion resistance and/or curing properties are desired.

SUMMARY

The present disclosure provides a coating composition, comprising:

- a resin component containing an epoxy resin and a petroleum resin;
- zinc particles in an amount of at least 65 wt.-%, based on the total solid weight of the coating composition;
- a metallic salt of phosphorous acid; and
- a hardener.

The present disclosure further provides a multi-part coating composition, which comprises at least the following two parts:

- Part A comprising a resin component, zinc particles and a metallic salt of phosphorous acid, wherein the resin component comprises an epoxy resin and a petroleum resin, and the amount of zinc particles is at least 65 wt.-%, based on the total solid weight of the coating composition; and
- Part B comprising a hardener.

The present disclosure further provides a method for preparing a coating composition, including providing at least the resin component, zinc particles, metallic salt of phosphorous acid, and the hardener as described above, or providing Part A and Part B comprising these components respectively, and then mixing them.

Finally, the present disclosure also provides a substrate coated with the coating composition of the present disclosure, in particular a steel and/or iron structure.

DETAILED DESCRIPTION OF THE DISCLOSURE

For purposes of the following detailed description, it is to be understood that the disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

In addition, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" epoxy resin, "a" petroleum resin, "a" metallic salt of phosphorous acid, "a" hardener and the like refer to one or more of any of these items.

The coating composition of the present disclosure can be advantageously formulated into a multi-part coating composition. In the case of a multi-part coating composition, the coating composition of the present disclosure comprises Part A as the base component or the binder of the coating.

The resin component of the coating composition of the present disclosure comprises an epoxy resin (also referred to as an epoxy compound herein). Suitable epoxy resins have more than one 1,2-epoxy group. They may be liquid type or solid type. Generally, the epoxy equivalent of epoxy resins is from 100 to 2,000 g/eqv., generally 150 to 500 g/eqv., such as 170 to 350 g/eqv., such as 180 to 300 g/eqv. Persons skilled in the art can understand that an epoxy equivalent means the gram number of an epoxy resin containing 1 equivalent epoxy group. Liquid type epoxy resins suitable for the present disclosure have relatively high viscosity and relatively low epoxy equivalent. The liquid type epoxy resin used for the present disclosure may have a viscosity at 25° C. from 8,000 to 16,000 cps, such as 10,000 to 12,000 cps. The viscosity is measured using the Brookfield viscometer, spindle 7 at 100 rpm.

In addition, suitable epoxy resins may be saturated or unsaturated, cyclic or acyclic, aliphatic, alicyclic, aromatic or heterocyclic. They may contain substituent(s), such as a halogen, a hydroxyl and/or an ether group.

The examples of epoxy resins may include a polyepoxide having a 1,2-epoxy equivalent of greater than 1, such as 2, i.e. having in average two epoxy groups per molecule. Polyepoxides commonly used as epoxy resins are polyglycidyl ethers of cyclic polyols, for example, polyglycidyl ethers of polyphenols such as bisphenol A, resorcinol, hydroquinone, benzenedimethanol, phloroglucinol and catechol; or polyglycidyl ethers of polyols such as alicyclic polyol, in particular cycloaliphatic polyol, such as 1,2-cyclohexandiol, 1,4-cyclohexandiol, 2,2-bis(4-hydroxylcyclohexyl)propane, 1,1-bis(4-hydroxylcyclohexyl)ethane, 2-methyl-1,1-bis(4-hydroxylcyclohexyl)propane, 2,2-bis(4-hydroxyl-3-tert-butylcyclohexyl)propane, 1,3-bis(methylol) cyclohexane and 1,2-bis(methylol)cyclohexane. Particularly suitable aliphatic polyols include trimethylpentylene glycol and neopentylene glycol.

The epoxy resin of the present disclosure can include, for example, those based on diglycidyl ethers of bisphenol A, bisphenol F, glycerin, novolac and the like. The epoxy resin of the present disclosure includes those based on bisphenol A, bisphenol F or mixtures thereof. Exemplary suitable polyepoxides are those as described in U.S. Pat. No. 4,681, 811, column 5, lines 33 to 58, the referenced parts being incorporated herein by reference.

Commercially available examples of suitable epoxy resins include: Shell EPON 828 (a bisphenol A-epichlorohydrin epoxy resin) and/or the blend of this resin with the difunctional epoxide reactive diluents, such as neopentylene glycol diglycidyl ether, resorcinol diglycidyl ether and cyclohexane dimethanol diglycidyl ether; bisphenol A type liquid epoxy resin, such as NPEL-128E; bisphenol A solid epoxy resin, such as YD-011X75; bisphenol F epoxy resin, i.e. Shell EPON DPL 862 (a bisphenol F-epichlorohydrin epoxy resin); and epoxy novolac resin, such as EPALLOY 8250 (an epoxy novolac resin) from CVC in Cherry Hill, N.J., Araldite EPN 1139 from Ciba Geigy, DEN438 from Dow Chemical. Suitable non-aromatic epoxy resins include diglycidyl ethers of hydronated cyclohexane dimethanol and hydronated bisphenol A type epoxy resin, such as: EPON 1510, EPON 4080E, HELOXY 107 and EPON 1513 (hydronated bisphenol A-epichlorohydrin epoxy resin) from Shell Chemical, Houston, Texas; Santolink LSE-120 from Monsanto in Springfield, Mass; EPODIL 757 (cyclohexane dimethanol diglycidyl ether) from Pacific Anchor in Allentown, Pa; Araldite XUGY358 and PY327 from Ciba Geigy in Hawthorne, New York; EPIREZ 505 from Rhone-Poulene in Louisville, Ky; AROFLINT 393 and 607 from Reichold in Pensacola, Florida; and ERL4221 from Union Carbide in Tarrytown, New York. Other suitable non-aromatic epoxy resins include DER 732 and DER 736.

The amount of the epoxy resin in the coating compositions described herein may be 3 to 25 wt.-%, such as 5 to 20 wt.-%, or 7 to 15 wt.-%, based on the total weight of the coating composition. The coating composition can comprise both liquid type epoxy resin and solid type epoxy resin as the epoxy resin component. The liquid type epoxy resin and the solid type epoxy resin can both comprise those as described above, such as bisphenol A and/or F type epoxy resins. The amount of liquid type epoxy resin may be from 0.5 to 15 wt.-%, such as 1 to 10 wt.-%, or 1 to 7 wt.-%, while the amount of solid type epoxy resin may be from 1 to 20 wt.-%, such as 2 to 15 wt.-%, or 2 to 12 wt.-%, based on the total weight of the coating composition.

Moreover, the resin component of the coating composition described herein comprises a petroleum resin. Petroleum resins are also known as hydrocarbon resins. Petroleum resins are thermoplatic resins produced from C5, C9 fractions produced from petroleum cracking through pretreatment, polymerization, distillation, and the like processes. In general, petroleum resins include aliphatic or cycloaliphatic resins based on C5 or cycloaliphatic dienes (such as dicyclopentadiene), and aromatic components based on C9, such as vinyl toluene or indene or aromatic resins and their mixtures. In some cases, petroleum resins also include their hydrogenated products, i.e. hydrogenated petroleum resins, such as C5 hydrogenated petroleum resins or C9 hydrogenated petroleum resins. Petroleum resins also can include modified petroleum resins, which are liquid resins of low viscosity, and contain inactive hydroxyl in its aromatic functional groups in contrast to the common petroleum resins, and may be used in solventborne, non-solvent type or high solid content epoxy systems. The petroleum resin and modified petroleum resin used according to the present disclosure are commercially available.

The amount of the petroleum resin in the coating composition can be >0 (such as 0.1 or 0.5) to 10 wt.-%, such as 1 to 8 wt.-%, or 1.5 to 5 wt.-%, based on the total weight of the coating composition.

In the coating composition according to the present disclosure, the weight ratio of the epoxy resin to the petroleum resin may be 2 to 10:1, such as 3 to 8:1, for example 6:1. Adding or mixing petroleum resin in the resin component comprising epoxy resin, especially in accord with the above ratios, the present coating composition can have a significantly improved hydrophilic and hydrophobic balance as compared with those having only epoxy resin.

According to the present disclosure, the coating composition also comprises zinc particles. In particular, the amount thereof is, based on the total solid weight of the coating composition, at least 65 wt.-%. As used herein, "particles" means materials in the form of particulates, such as powder or dust and flake, and may be in the form of any shape, such as, for example, spherical, ellipsoidal, cubical, rod-shaped, disk-shaped, prism-shaped, and the like.

As used herein, "zinc" or "zinc particles" means metal particles substantially consisting of zinc individual particles or having high zinc purity. Suitable purity of zinc particles refers generally to at least 94%, such as at least 96% or at least 98% or 99% of metallic zinc, based on total weight of particles, such as metal particles marketed as zinc powders or zinc dusts, and also includes metal particles having up to 100% of metallic zinc. Any portion of the particles used herein that is not zinc may be other metallic elements or the compounds thereof, for example coating layers of the particles and/or alloy materials formed with zinc. Suitable zinc particles can conform to for example zinc powder specifications according to type II or type III in ASTM D520. In addition, particles of zinc alloys substantially based on zinc as the primary metal also may be used as the zinc particles of the present disclosure, so long as they comprise at least 94% of metallic zinc, based on the total weight of the particle. Correspondingly, those alloys having zinc as a primary metal but containing other metallic elements at a significant amount, such as more than 6%, for example, zinc alloys comprising 50 wt.-% or more and generally lower than 94%, such as 90% of zinc, are not in the scope of the "zinc" or "zinc particles" of the present disclosure.

The average particle size of zinc particles may be at least 1 μm, such as at least 2 μm, such as at least 5 μm, such as at least 5.5 μm, such as at least 6 μm, and may be no greater than 150 μm, such as no greater than 30 μm, such as no greater than 20 μm, such as no greater than 10 μm, such as no greater than 8 μm. The average particle size of zinc particles may be from 1 to 150 μm, such as 2 to 30 μm, such as 5 to 20 μm, such as 5.5 to 10 μm, such as 6 to 8 μm. The selection of particle size may depend on the expected viscosity and application property of the coating composition. The reported average particle sizes herein are average particle sizes provided by zinc particle manufacturers and can be measured by multiple known methods of the present technical field, such as laser diffraction method and the like.

Based on the total solid weight of the coating composition, the coating composition may include at least 65 wt.-% of zinc particles, such as at least 70 wt.-% of zinc particles, such as at least 75 wt.-% of zinc particles, such as at least 80 wt.-% of zinc particles, such as at least 85 wt.-% of zinc particles, and can include no more than 95 wt.-% of zinc particles, such as no more than 90 wt.-% of zinc particles, such as no more than 85 wt.-% of zinc particles. Although the coating composition of the present disclosure may also contain other metal particles, such as those particles of zinc alloy having a zinc content of lower than 94% or aluminum or aluminum alloy and the like, the coating composition would suitably include them in only a very small amount, such as no more than 5%, 4%, 3% or 1%, based on total solid weight of coating composition, the compositions may also be completely free of other metal particles, including metallic elements (i.e. zero valency) and metal alloys of other metals.

In addition, the zinc particles may be subjected to a surface treatment to modify the surface of the zinc particle. The surface treated zinc particles may comprise a pretreatment layer formed by exposing the zinc particle to a pretreatment composition. As used herein, the term “pretreatment composition” refers to a composition that upon contact with the zinc material reacts with and chemically alters the material surface and binds to it to form a protective layer. The pretreatment composition used to modify the surface of the zinc particles may comprise any known in the art for pretreating zinc material.

Moreover, according to the present disclosure, a metallic salt of phosphorous acid is also used in the coating composition. A “salt of phosphorous acid” means an inorganic salt containing phosphorus element in the anion acid group, including phosphate, phosphite, hypophosphite, hydrogen phosphate, dihydrogen phosphate, hydrogen phosphite, dihydrogen phosphite, polyphosphate or polyphosphate and the like, wherein phosphate, polyphosphate and hydrogen phosphate may be preferred. Metals (such as molybdenum) or non-metal (such as silicon) modified forms, such as phosphosilicate can also be used as the salts of phosphorous acid. Metals that are in the cation part of the metallic salts of phosphorous acid include zinc, aluminum, magnesium, calcium, strontium, zirconium, iron, barium and the like. It may be desired to exclude alkaline metals from such metal forming the metallic salt.

Specific examples of suitable metallic salts of phosphorous acid include zinc phosphate, aluminum tripolyphosphate, strontium aluminum polyphosphate, zirconium hydrogen phosphate, and silicon (such as silicate) modified phosphate salt or polyphosphate salt, such as zinc strontium calcium phosphosilicate. The metallic salt of phosphate, such as zinc phosphate is particularly suitable.

When using metallic salts of phosphorous acid in the zinc rich epoxy resin based coating composition, in particular when for example at least 65 wt.-%, at least 70 wt.-%, at least 75 wt.-%, or at least 80 wt.-% of zinc particles are used in combination with metallic salts of phosphorous acid, better long term corrosion resistance may be obtained as compared to other coatings teaching this combination. In addition, it has also been found that controlling the weight ratio of the metallic salts of phosphorous acid to the zinc particles in a range of 1:20 to 1:60, such as 1:25 to 1:45 is particularly advantageous, especially when the amount of zinc particles exceeds or is greater than 75 wt.-%.

The coating compositions also comprise a hardener component. The hardener component suitable for epoxy resin may comprise an amine component. The amine component may comprise any compound that can act as a nitrogen source, such as a protein, polypeptide, amino acid, organic amine, polyamine, ammonia, ammonium salt of monomeric polycarboxylic acid, ammonium salt of polymerized polycarboxylic acid, ammonium salt of inorganic acid, polyetheramines, polyamides, their adducts with epoxy resin such as bisphenol A solid epoxy resin, and their mixture and the like.

Suitable hardeners may include, for example, polyamine. Non-limited examples of polyamine hardeners include primary or secondary diamines or polyamines, wherein the groups linked to nitrogen atom may be saturated or unsaturated aliphatics, alicyclics, aromatics, aromatic substituted aliphatics, aliphatic substituted aromatics and heterocyclics. Non-limited examples of suitable aliphatic and alicyclic diamine include 1,2-ethylene diamine, 1,2-propylene diamine, 1,8-octane diamine, isophorone diamine, propane-2,2-cyclohexyl amine and the like. Non-limited examples of suitable aromatic polyamines include phenylene diamine and toluene diamine, such as meta-xylylene diamine, o-phenylene diamine and p-toluene diamine. Multicore aromatic diamines, such as 4,4'-biphenyl diamine, methylene diphenyl amine and choloromethylene diphenyl amine are also suitable.

Examples of suitable aliphatic diamines include, but are not limited to: ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluene diamine, 2,4'- and/or 4,4'-diamino-dicyclohexylmethane and 3,3'-dialkyl 4,4'-diamino-dicyclohexylmethane (such as 3,3'-dimethyl-4,4'-diamino-dicyclohexyl methane and 3,3'-diethylene-4,4'-diamino-dicyclohexyl methane), 2,4- and/or 2,6-diaminotoluene and 2,4'- and/or 4,4'-diaminodiphenyl methane, or mixtures thereof. Alicyclic diamines are available commercially from Huntsman Corporation (Houston, TX) under the name of JEFFLINK such as JEFFLINK 754. Further aliphatic cyclic polyamines may also be used, such as DESMOPHEN NH 1520 available from Covestro AG and/or CLEARLINK 1000, a secondary aliphatic diamine available from Dorf Ketal. POLYCLEAR 136 (available from BASF/Hansen Group LLC); the reaction product of isophorone diamine and acrylonitrile is also suitable. Other exemplary suitable polyamines are described in U.S. Pat. No. 4,046,729, column 6, line 61 to column 7, line 26, and in U.S. Pat. No. 3,799,854, column 3, lines 13 to 50, the cited portions of which are incorporated by reference herein. Additional polyamines may also be used, such as ANCAMINE polyamines, available from Evonik Industries.

Suitable polyamides include any of polyamides known in the art. The polyamide used as a hardener is usually a product formed by the condensation of dimer acid (or ester) and polyamines. For example, ANCAMIDE polyamides, available from Evonik Industries.

The hardener may also include polyetheramines. Polyetheramines are compounds having a structure of polyether main chain and further comprises amine groups as terminal active functional groups. Polyetheramines are obtained by aminization of polyethylene glycol, polypropylene glycol or ethylene glycol/propylene glycol copolymer under high temperature and high pressure. By selecting different polyoxyalkyl structure, the reactivity, toughness, viscosity and hydrophilicity and other properties of the polyetheramines can be adjusted. Amine groups provide polyetheramines with reactive properties with a variety of compounds. Polyetheramines that can be used in the present disclosure include polyethermonoamine, polyether diamine, polyether triamine and the like. Specifically, the polyetheramines used in the present disclosure can include poly oxide ethylene diamine, poly oxide propylene diamine, poly oxide butylene diamine, and poly oxide ethylene triamine, poly oxide propylene triamine, poly oxide butylene triamine. The examples of commercially available products of the polyetheramines that can be used in the present disclosure can include, for example, Jeffamine series products. Examples of such polyetheramines include aminated propoxylated pentaerythritols, such as JEFFAMINE XTJ-616, and those represented by Formulas (IV) through (VI).

According to Formula (IV) the polyether amine may comprise or be represented by:

Formula (IV)

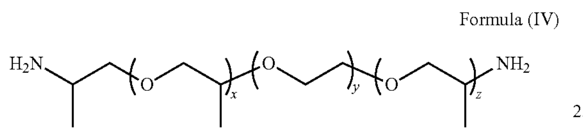

wherein y=0-39, x+z=1-68.

Suitable amine-containing compounds represented by Formula (IV) of the present disclosure include, but are not limited to, amine-terminated polyethylene glycol such as those commercially available from Huntsman Corporation in its JEFFAMINE ED series, such as JEFFAMINE HK-511, JEFFAMINE ED-600, JEFFAMINE ED-900 and JEFFAMINE ED-2003, and amine-terminated polypropylene glycol such as in its JEFFAMINE D series of Huntsman Corportion, such as JEFFAMINE D-230, JEFFAMINE D-400, JEFFAMINE D-2000 and JEFFAMINE D-4000.

According to Formula (V) the polyetheramine may comprise or be represented by:

Formula (V)

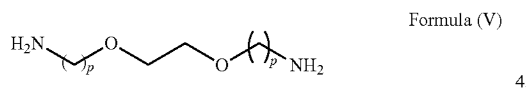

wherein each p independently is 2 or 3.

Suitable amine-containing compounds represented by Formula (V) of the present disclosure include, but are not limited to, amine-terminated polyethylene glycol based diamines, such as Huntsman Corporation's JEFFAMINE EDR series, such as JEFFAMINE EDR-148 and JEFFAMINE EDR-176.

According to Formula (VI) the polyetheramine may comprise or be represented by:

Formula (VI)

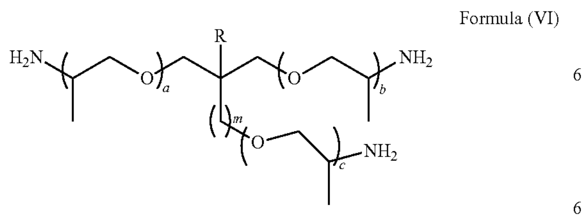

wherein R is H or $C_2H_5$, m=0 or 1, a+b+c=5-85.

Suitable amine-containing compounds represented by Formula (VI) of the present disclosure include, but are not limited to, amine-terminated propoxylated trimethylolpropane or glycerol, such as Huntsman Corporation's Jeffamine T series, such as JEFFAMINE T-403, JEFFAMINE T-3000 and JEFFAMINE T-5000.

The amine component may also optionally include polyamines containing other functional groups or moieties, for example, 2,4,6-tris(dimethylaminomethyl)phenol.

In order to achieve faster curing and drying rate, the adducts of the above amine compounds, such as, polyetheramines, polyamides and/or polyamines (like those aliphatic diamines, alicyclic diamines or aromatic diamines as described above) and epoxy resin can be advantageously used as the hardener component. The epoxy resins can be those as described above, such as, epoxy compounds based on bisphenol F or bisphenol A.

The hardener component of the coating compositions may also optionally comprise a hardening promoter. The hardening promoter is used for promoting the reactions between the amine component and the epoxy resin. Exemplary hardening promoters include, but are not limited to, salicylic acid.

The amount of the hardening promoter of the coating composition of the present disclosure may be 0 to 3 wt.-%, such as 1 to 2.5 wt.-%, or 1.5 to 2 wt.-%, based on the total weight of the hardener component of the coating composition.

The coating composition of the present disclosure may also comprise one or more solvents. Solvents commonly used for coating fields can be used for the present disclosure. Specific examples of solvents include, but not limited to: propylene glycol monomethyl ether acetate and the derivatives thereof, acetone, amyl propionate, anisole, benzene, butyl acetate, cyclohexane, dialkyl ethers of ethylene glycol, diethylene glycol dibenzoate, dimethyl sulfoxide, dimethyl formamide, dimethoxybenzene, ethyl acetate, isopropanol, isobutanol, methyl cyclohexanone, cyclopentanone, methyl ethyl ketone, methyl isobutyl ketone, methyl propionate, propylene carbonate, tetrahydrofuran, toluene, xylene, benzyl alcohol, 2-methoxyethyl ether, 3-propylene glycol methyl ether, and mixtures thereof.

The amount of one or more solvents in the coating composition of the present disclosure may be from 5 to 15 wt.-%, such as 7 to 12 wt.-%, or 8 to 11 wt.-%, based on the total weight of the coating composition.

The coating compositions may also optionally comprise one or more additives, including, but not limited to thixotropic agent, wetting and dispersing agent, fillers, pigments, and other additives commonly used in coating compositions.

Thixotropic agents are used for improving and/or maintaining the rheology of the coating composition and can prevent zinc powder particles and fillers, if used, in the coating from settling. Examples of thixotropic agents may include colloidal silicate, hydrated aluminum silicate (bentonite), aluminum tristearate, aluminum monostearate, xanthan gum, chrysotile, calcined silica, hydrogenated castor oil, organically modified clay, polyamide wax and polyethylene wax, and the like. The amount of the thixotropic agent can be selected by the person skilled in the art according to actual needs. For example, the amount of the thixotropic agent of the coating composition of the present disclosure may be from 0.5 to 1.5 wt.-%, such as 0.6 to 1.1 wt.-%, based on the total weight of the coating composition.

Wetting and dispersing agents can improve the dispersibility of the zinc particles and fillers, if used, in the coating. Suitable examples of wetting and dispersing agents include lecithin, amine alkylated polyhydroxy acid amide, polyester with amino substituted end groups, block copolymer, ethylene polymers, and the like. The amount of the wetting and dispersing agent in the coating composition of the present disclosure may be 0.1 to 0.5 wt.-%, such as 0.2 to 0.4 wt.-%, based on the total weight of the coating composition.

The coating composition, in particular Part A of the composition as described below, may comprise a filler different from zinc particles. Suitable fillers include, but are not limited to, talc, silicate, mica, montmorillonite, kaolin, diatomaceous earth, vermiculite, natural and synthetic zeolite, calcium silicate, aluminum silicate, sodium aluminum silicate, hollow microspheres, such as hollow glass microspheres, barium sulfate, calcium carbonate, and the like. The coating composition of the present disclosure, in particular Part A of the composition, may comprise talc powders, silicate, and/or hollow microspheres, such as hollow glass microspheres as the fillers. The coating composition, in particular Part A of the composition, may also optionally comprise barium sulfate as the filler. The amount of the fillers in the coating compositions of the present disclosure may range from 2 to 8% based on the total weight of the coating composition. The content of the hollow microspheres, such as hollow glass microspheres, may be 1 to 5% based on the total weight of the composition.

Examples of pigments and/or pigment compositions include, but are not limited to, carbazole dioxazine crude pigment, azos, monoazos, diazos, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, iron oxides, carbon black, carbon fiber, graphite, other conductive pigments and/or fillers, and mixtures thereof.

The amount of the pigments and/or pigment compositions in the coating composition may be in a range of 0.5 to 5 wt.-%, such as 0.5 to 3 wt.-%, based on the total weight of the coating composition.

The coating composition of the present disclosure can be formulated into a multi-part form. The multi-part system is a term known in the coating fields, meaning that the ingredients of a coating composition are formulated into multiple parts or components which are packed in separate containers, such as waterproof containers. The multi-part coating composition comprises at least the following two parts:

Part A, comprising the resin component, zinc particles and metallic salt of phosphorous acid as defined above, wherein the resin component comprises epoxy resin and petroleum resin and the amount of zinc particles is at least 65 wt.-%, based on the total solid weight of the coating composition; and Part B, comprising the hardener.

The preparation method of Part A of the coating composition is known to the person skilled in the art. For example, at normal temperature or slightly elevated temperature, each components of Part A are mixed and stirred in a container until a proper viscosity is achieved. Likewise, the preparation method of Part B of the coating composition is known to persons skilled in the art and may be carried out similar to the above preparation method of Part A.

Prior to using the coating composition described herein, the components are mixed. In case of a multi-part coating composition, Part A and Part B, and any other part, are mixed. Part A and Part B may be mixed at a stoichiometric ratio of epoxy groups to amine groups of 1:0.5 to 1:0.9. Afterwards, the resulting coating composition is applied onto a substrate. There are no limitations to the method for applying the coating composition of the present disclosure onto a substrate. For instance, the application methods may include brush coating, spray coating, dip coating, roller coating, curtain coating and the like.

The substrates that can be applied with the coating composition of the present disclosure may be metal substrates. The metal substrates include various steel substrates, iron substrates, aluminum substrates and the like. Advantageously, the coating composition of the present disclosure may be applied on these substrates as a primer or an underlying coating. The substrate can be part of a structure or part of a vehicle. "Structure" as used herein refers to any part of a building, bridge, transportation infrastructure, oil rig, oil platform, water tower, power line tower, support structures, wind turbines, walls, piers, docks, levees, dams, shipping containers, trailers, battery components, batteries, and any metal structure that is exposed to a corrosive environment. "Vehicle" as used herein refers, in its broadest sense, to all types of vehicles, such as but not limited to cars, trucks, buses, tractors, harvesters, heavy duty equipment, vans, golf carts, motorcycles, bicycles, railcars, subway cars, airplanes, helicopters, boats of all sizes and the like.

The following Examples are presented for the purpose of providing a more detailed description. However, the following examples are used for illustrating the disclosure but should not be considered as limited to their details. All parts and percentages in the following Examples and the description are by weight unless otherwise indicated.

EXAMPLES

Overview of Main Raw Materials Used in the Examples

| Commercial name | Composition |
|---|---|
| NPEL-128E | Bisphenol A-epichlorohydrin epoxy resin |
| YD-011X75 | Bisphenol A-epichlorohydrin epoxy resin |
| ARL GY285 | Bisphenol F epoxy resin |
| SK-120 | Petroleum Resins |
| HX600-II | Zinc powder |
| GLASS BUBBLES VS5500 | Soda-lime borosilicate glass |
| Crayvallac ultra | Polyamide wax |
| Bentone SD-2 | Organic bentonite |
| Topcithin 50 | Soybean lecithin |
| G-640P | Polyamide |
| Ancamine K54 | 2,4,6-tris(dimethylaminomethyl)phenol |
| MXDA | Meta-xylene diamine |
| Jeffamine T-403 | Polyoxypropylene triamine |

Preparation of Binder Part A1

Procedure of preparation of Binder part A1 was as follows: In a vessel at the room temperature, 10 g of a bisphenol A liquid epoxy resin (NPEL-128E, commercially available from Nan Ya Plastics), 100 g of bisphenol A solid epoxy resin (YD-011X75, commercially available from KUKDO CHEMICAL), 30 g of xylene, 17.7 g of propylene glycol monomethyl ether acetate and 7.3 g of isobutanol were homogeneously mixed, and then 18.1 g of a petroleum resin (SK 120, commercially available from Taiwan Yuen Liang) was added under stirring and allowed to be completely solved. Then, 5.3 g of a polyamide wax (Crayvallac ultra, commercially available from ARKEMA) and 5.3 g of an organic bentonite (BENTONE SD-2, commercially available from ELEMENTIS SPECIALTIES) were added under stirring slowly until being evenly dispersed, with the temperature kept at no more than 40° C. 2.7 g of a soybean lecithin (TOPCITHIN 50, commercially available from CARGILL), 19.5 g of zinc phosphate (commercially available from Jiangsu Shen Long Zinc Co. Ltd.), and 771.9 g of zinc powders (HX600 to II, commercially available from Jiangsu Shen Long Zinc Co. Ltd.) were added under stirring with the temperature kept at 55 to 60° C. for 30 minutes. Finally, 38.7 g of xylene, and 19.5 g of hollow glass microspheres (GLASS BUBBLES VS5500, commercially available from 3M) were added under stirring until being evenly dispersed.

Preparation of Binder Part A2 (Comparative)

It was carried out similar to the above the procedure of Preparation of Binder Part A1 of the coating composition of the present disclosure, and weight parts of each components are shown in Table 1. The difference is that no zinc phosphate was used and the amount of the petroleum resin was increased.

Preparation of Binder Part A3

Procedure of preparation of Binder Part A3 was as follows: In a vessel at the room temperature, 10 g of a bisphenol A liquid epoxy resin (NPEL-128E, commercially available from Nan Ya Plastics), 119.5 g of bisphenol A solid epoxy resin (YD-011X75, commercially available from KUKDO CHEMICAL), 30 g of xylene, 17.7 g of propylene glycol monomethyl ether acetate and 7.3 g of isobutanol were homogeneously mixed, and then 18.1 g of a petroleum resin (SK 120, commercially available from Taiwan Yuen Liang) was added under stirring and allowed to be completely solved. 5.3 g of a polyamide wax (Crayvallac ultra, commercially available from ARKEMA) and 5.3 g of an organic bentonite (BENTONE SD-2, commercially available from ELEMENTIS SPECIALTIES) were added while stirring slowly until being evenly dispersed, with the temperature kept at no more than 40° C. 2.7 g of a soybean lecithin (TOPCITHIN 50, commercially available from CARGILL), 19.5 g of zinc phosphate (commercially available from Jiangsu Shen Long Zinc Co. Ltd.) and 800 g of zinc powders (HX600 to II, commercially available from Jiangsu Shen Long Zinc Co. Ltd.) were added under stirring, with the temperature kept at 55 to 60° C. for 30 minutes. Finally, 45.1 g of xylene and 19.5 g of hollow glass microspheres (GLASS BUBBLES VS5500, commercially available from 3M) were added under stirring until being evenly dispersed.

Preparation of Binder Part A4

Procedure of Binder Part A4 was as follows: In a vessel at the room temperature, 42.5 g of a bisphenol A liquid epoxy resin (NPEL-128E, commercially available from Nan Ya Plastics), 28.3 g of bisphenol A solid epoxy resin (YD-011X75, commercially available from KUKDO CHEMICAL), 30 g of xylene, 17.7 g of propylene glycol monomethyl ether acetate, and 7.3 g isobutanol were homogeneously mixed, and then 18.1 g of a petroleum resin was added (SK 120, commercially available from Taiwan Yuen Liang) under stirring and allowed to be completely solved. 5.3 g of a polyamide wax (Crayvallac ultra, commercially available from ARKEMA) and 5.3 g of an organic bentonite (BENTONE SD-2, commercially available from ELEMENTIS SPECIALTIES) were added under stirring slowly until being evenly dispersed, with the temperature kept at no more than 40° C. 2.7 g of a soybean lecithin (TOPCITHIN 50, commercially available from CARGILL), 19.5 g of zinc phosphate (commercially available from Jiangsu Shen Long Zinc Co. Ltd.), and 752.4 g of zinc powders (HX600 to II, commercially available from Jiangsu Shen Long Zinc Co. Ltd.) were added under stirring, with the temperature kept at 55 to 60° C. for 30 minutes. Finally, 41.4 g xylene, and 19.5 g hollow glass microspheres (GLASS BUBBLES VS5500, commercially available from 3M) were added under stirring until being evenly mixed.

Preparation of Binder Part A5 (Comparative)

It was carried out similar to the above procedure of Preparation of Binder Part A4 of the coating composition of the present disclosure, and weight parts of each components are shown in Table 1. The difference is that no zinc phosphate was used and the amount of the petroleum resin was increased.

Preparation of Binder Part A6 (Comparative)

It was carried out similar to the above procedure of Preparation of Binder Part A4 of the coating composition of the present disclosure, and weight parts of each components are shown in Table 1. The difference is that no petroleum resin was used.

Preparation of Binder Part A7 (Comparative)

It was carried out similar to the above procedure of Preparation of Binder Part A4 of the coating composition of the present disclosure, and weight parts of each components are shown in Table 1. The difference is that no petroleum resin, zinc phosphate, hollow glass microspheres were used, but the filler talc powders were added.

Preparation of Binder Parts A8 and A9 (Comparative)

It was carried out similar to the above procedure of Preparation of Binder Part A7, and weight parts of each components are shown in Table 1. The difference is that the fillers talc powders were added and the amount of zinc particles was correspondingly decreased.

The components and amounts shown in the following Table 1 were used to prepare individual Binder Parts.

TABLE 1

Composition of Binder Parts

| Components | A1 | A2 (Comp.) | A3 | A4 | A5 (Comp.) | A6 (Comp.) | A7 (Comp.) | A8 (Comp.) | A9 (Comp.) |
|---|---|---|---|---|---|---|---|---|---|
| | Weight, g | | | | | | | | |
| Bisphenol A liquid epoxy resin | 10 | 10 | 10 | 42.5 | 42.5 | 48.5 | 57.5 | 57.5 | 57.5 |
| Bisphenol A solid epoxy resin | 100 | 100 | 119.5 | 28.3 | 28.3 | 32.3 | 38.2 | 38.2 | 38.2 |
| Petroleum resin | 18.1 | 37.68 | 18.1 | 18.1 | 37.68 | — | — | — | — |
| Xylene | 68.7 | 71.82 | 75.1 | 71.4 | 76.32 | 66 | 61.5 | 61.5 | 61.5 |
| Isobutanol | 7.3 | 7.3 | 7.3 | 7.3 | 7.3 | 7.3 | 7.3 | 7.3 | 7.3 |
| Propylene glycol monomethyl ether acetate | 17.7 | 17.7 | 17.7 | 17.7 | 17.7 | 17.7 | 17.7 | 17.7 | 17.7 |
| Polyamide wax | 5.3 | 5.3 | 5.3 | 5.3 | 5.3 | 5.3 | 5.3 | 5.3 | 5.3 |
| Organic bentonite | 5.3 | 5.3 | 5.3 | 5.3 | 5.3 | 5.3 | 5.3 | 5.3 | 5.3 |
| Soybean lecithin | 2.7 | 2.7 | 2.7 | 2.7 | 2.7 | 2.7 | 2.7 | 2.7 | 2.7 |
| Hollow glass microspheres | 19.5 | 19.5 | 19.5 | 19.5 | 19.5 | 19.5 | — | — | — |

TABLE 1-continued

| Composition of Binder Parts | | | | | | | | | |
|---|---|---|---|---|---|---|---|---|---|
| Components | A1 | A2 (Comp.) | A3 | A4 | A5 (Comp.) | A6 (Comp.) | A7 (Comp.) | A8 (Comp.) | A9 (Comp.) |
| | Weight, g | | | | | | | | |
| Zinc phosphate | 19.5 | — | 19.5 | 19.5 | — | 19.4 | — | — | — |
| Talc powders | — | — | — | — | — | — | 27.9 | 124.5 | 224.5 |
| Zinc powders | 771.9 | 771.9 | 800 | 752.4 | 752.4 | 771.9 | 776.6 | 680 | 580 |
| Total weight | 1046 | 1049.2 | 1100 | 990 | 995 | 995.9 | 1000 | 1000 | 1000 |

Hardener Part B1

The components and amounts shown in the following Table 2 were used to prepare Hardener Part B1.

TABLE 2

| Composition of Hardener Part B1 | | | |
|---|---|---|---|
| Components | Amount (wt %) | Manufacturer | Name |
| Polyamide | 26.6 | KUKDO CHEMICAL | G-640P |
| 2,4,6-tris(dimethyl-aminomethyl)phenol | 5 | EVONIK INDUSTRIES | ANCAMINE K54 |
| Xylene | 23.5 | Mitsubishi Chemical | |
| Isobutanol | 22.6 | Dow Chemical | |
| Bisphenol A solid epoxy resin | 22.3 | KUKDO CHEMICAL | YD-011X75 |

The preparation procedure of Hardener part B1 was as follows: In an iron vessel at the room temperature, part of the solvents xylene and isobutanol and polyamide, as well as 2,4,6-tris(dimethylaminomethyl) phenol were added and mixed homogeneously. Bisphenol A solid epoxy resin was added under stirring. Finally, the remaining solvents were added and mixed homogeneously. It was placed at the room temperature for at least 3-day prior to use.

Hardener Part B2

The components and amounts shown in the following Table 3 were used to prepare Hardener Part B2.

TABLE 3

| Composition of Hardener Part B2 | | | |
|---|---|---|---|
| Components | Amount (wt %) | Manufacturer | Name |
| Meta-xylene diamine | 16.7 | Mitsubishi Gas Chemical Company | MXDA |
| 2,4,6-tris(dimethyl-aminomethyl)phenol | 4 | EVONIK INDUSTRIES | ANCAMINE K54 |
| Polyoxypropylene triamine | 16.1 | HUNTSMAN | JEFFAMINE T-403 |
| Bisphenol F epoxy resin | 20.8 | HUNTSMAN | ARL GY285 |
| Xylene | 22.7 | Mitsubishi Chemical | |
| Isobutanol | 5.7 | Dow Chemical | |
| Benzyl alcohol | 14 | Luxi Chemical | |

The preparation procedure of Hardener Part B2 was as follows: In a beaker at the room temperature, part of the solvents xylene and isobutanol and meta-xylene diamine were added and mixed homogeneously. Bisphenol F epoxy resin was added under stirring, and temperature was raised to 90 to 100° C., allowing the reaction for 1 hour. After the temperature was lowered to 70 to 75° C., polyoxypropylene triamine, 2,4,6-tris(dimethylaminomethyl)phenol, benzyl alcohol and the remaining solvents were added and mixed homogeneously.

Hardener Part B3

The components and amounts shown in the following Table 4 were used to prepare Hardener Part B2.

TABLE 4

| Composition of Hardener Part B3 | | | |
|---|---|---|---|
| Components | Amount (wt %) | Manufacturer | Name |
| Polyamide | 40.6 | KUKDO CHEMICAL | G-640P |
| 2,4,6-tris(dimethyl-aminomethyl)phenol | 5 | EVONIK INDUSTRIES | ANCAMINE K54 |
| Xylene | 16.8 | Mitsubishi Chemical | |
| Isobutanol | 13.7 | Dow Chemical | |
| Benzyl alcohol | 13.5 | Luxi Chemical | |
| Bisphenol A liquid epoxy resin | 10.4 | Nan Ya Plastics | NPEL-128E |

The preparation procedure of Hardener Part B3 was as follows: In an iron vessel at the room temperature, benzyl alcohol, solvents xylene and isobutanol, polyamide, and 2,4,6-tris(dimethylaminomethyl)phenol were added and mixed homogeneously. Bisphenol A liquid epoxy resin was added under stirring and mixed homogeneously. It was placed at the room temperature for at least 3-day prior to use.

Coating Formulation Example 1

At room temperature, Binder Part A1 and Hardener Part B1 were combined. The stoichiometric ratio of binder part to hardener part was 1:0.75, and the volumetric ratio of binder to hardener part was 85:15.

Coating Formulation Example 2 (Comparative)

At the room temperature, Binder part A2 and Hardener Part B1 were combined. The stoichiometric ratio of binder part to hardener part was 1:0.78, and the volumetric ratio of binder to hardener part was 85:15.

Coating Formulation Example 3

At the room temperature, Binder part A3 and Hardener Part B2 were combined. The stoichiometric ratio of binder part to hardener part was 1:0.76, and the volumetric ratio of binder to hardener part was 90:10.

Coating Formulation Example 4

At the room temperature, Binder part A4 and Hardener Part B1 were combined. The stoichiometric ratio of binder part to hardener part was 1:0.75, and the volumetric ratio of binder to hardener part was 77.5:22.5.

Coating Formulation Example 5 (Comparative)

At the room temperature, Binder part A5 and Hardener Part B1 were combined. The stoichiometric ratio of binder part to hardener part was 1:0.79, and the volumetric ratio of binder to hardener part was 80:20.

Coating Formulation Example 6 (Comparative)

At the room temperature, Binder part A6 and Hardener Part B1 were combined. The stoichiometric ratio of binder part to hardener part was 1:0.75, and the volumetric ratio of binder to hardener part was 80:20.

Coating Formulation Example 7 (Comparative)

At the room temperature, Binder part A6 and Hardener Part B2 were combined. The stoichiometric ratio of binder part to hardener part was 1:0.73, and the volumetric ratio of binder to hardener part was 90:10.

Coating Formulation Example 8 (Comparative)

At the room temperature, Binder part A7 and Hardener Part B3 were combined. The stoichiometric ratio of binder part to hardener part was 1:0.77, and the volumetric ratio of binder to hardener part was 80:20.

Coating Formulation Example 9 (Comparative)

At the room temperature, Binder part A8 and Hardener Part B3 were combined. The stoichiometric ratio of binder part to hardener part was 1:0.81, and the volumetric ratio of binder to hardener part was 80:20.

Coating Formulation Example 10 (Comparative)

At the room temperature, Binder part A9 and Hardener Part B3 were combined. The stoichiometric ratio of binder part to hardener part was 1:0.87, and the volumetric ratio of binder to hardener part was 80:20.

Property Tests:

1. Drying Property Test

A blade applicator with 150 μm opening was used. The coating compositions prepared as described above were blade coated onto a glass bar. The drying property of the coatings was tested (ASTM D1640). Test results are shown in Table 5 below.

2. Salt Spray Resistance Test ASTM B117

The coatings of individual Examples as described above were applied onto sand blasted Sa2.5 carbon steel panels of 150 mm×75 mm×5 mm (length*width*thickness), and the dry film thicknesses was 100 μm. Coating film was allowed to be completely cured by drying at room temperature for 14 days. Salt Spray Resistance Test was conducted according to ASTM B117. Test results are shown in Table 5 below.

3. Humidity and Heat Resistance Test ASTM D 2247

The coatings of individual Examples as described above were applied onto sand blasted Sa2.5 carbon steel panels of 150 mm×75 mm×5 mm (length*width*thickness), and the dry film thicknesses was 100 μm. Coating film was allowed to be completely cured by drying at room temperature for 14 days. Humidity and heat resistance test was conducted according to ASTM D 2247. Test results are shown in Table 5 below.

4. Cyclic Aging Test ISO12944-9

The coatings of individual Examples as described above were applied onto sand blasted Sa2.5 carbon steel panels of 150 mm×75 mm×5 mm (length*width*thickness), and the dry film thicknesses was 60 μm. Then an epoxy intermediate coat was sprayed at a dry film of 170 μm, and then a polyurethane topcoat was sprayed at a dry film of 50 μm. Coated films were allowed to be completely cured by drying at room temperature for 14 days. According to the conditions in ISO12944-9, 25 cycles of Cyclic Aging Test were conducted. The conditions of one cycle of Cyclic Aging Test are 72-hour UVA (ISO 16474-3, Method A), 72-hour Salt Spray Test (ISO9227), frozen at −20° C. for 24 hours. Test results are shown in Table 5 below.

TABLE 5

Test Results of Coatings

| Coating formulations | 1 | 2 (Comp.) | 3 | 4 | 5 (Comp.) | 6 (Comp.) | 7 (Comp.) | 8 (Comp.) | 9 (Comp.) | 10 (Comp.) |
|---|---|---|---|---|---|---|---|---|---|---|
| Stoichiometric ratio of binder part to hardener part | 1:0.75 | 1:0.78 | 1:0.76 | 1:0.75 | 1:0.79 | 1:0.75 | 1:0.73 | 1:0.77 | 1:0.82 | 1:0.87 |
| Volumetric ratio of binder part to hardener part | 85:15 | 85:15 | 90:10 | 80:20 | 80:20 | 77.5:22.5 | 90:10 | 80:20 | 80:20 | 80:20 |
| Weight ratio of binder part to hardener part | 94.1:5.9 | 94:6 | 96:4 | 92.2:7.8 | 93:7 | 91.4:8.6 | 96:4 | 93.2:6.8 | 92.6:7.4 | 92.1:7.9 |
| Density (g/L) | 2.36 | 2.28 | 2.40 | 2.37 | 2.28 | 2.42 | 2.37 | 2.75 | 2.57 | 2.42 |
| Zinc powder content in dry film | 80.5% | 80.4% | 80.9% | 81.2% | 81.0% | 80.3% | 80.7% | 82.9% | 71.6% | 60.9% |
| Drying Test, according to ASTM D1640 | | | | | | | | | | |
| Dry-to-touch time (hour) | 0.5 | 0.5 | 0.5 | 0.5 | 0.5 | 0.5 | 0.5 | 2.5 | 2.5 | 2.5 |
| Dry-hard time (hour) | 1 | 1 | 1 | 1 | 1 | 1 | 1 | 3.0 | 3.0 | 3.0 |

TABLE 5-continued

Test Results of Coatings

| Coating formulations | 1 | 2 (Comp.) | 3 | 4 | 5 (Comp.) | 6 (Comp.) | 7 (Comp.) | 8 (Comp.) | 9 (Comp.) | 10 (Comp.) |
|---|---|---|---|---|---|---|---|---|---|---|
| Salt Spray Resistance Test, 1000 hour, according to ASTM B117 | | | | | | | | | | |
| Surface blistering, ASTM D714 | No | No | No | No | No | Yes | Yes | No | Some | Yes |
| Surface rusting, ASTM D1654 | No | Some | No | No | Some | No | Some | No | Some | Yes |
| Humidity and Heat Resistance Test, 1000 Hours, according to ASTM D 2247 | | | | | | | | | | |
| Surface blistering, ASTM D714 | No | No | No | No | No | No | Yes | No | No | No |
| Surface rusting, ASTM D1654 | No | No | No | No | No | No | No | No | No | No |
| Cyclic Aging Test ISO12944-9 | | | | | | | | | | |
| Surface blistering | No | No | No | No | No | No | No | No | No | No |
| Corrosion at scribe (mm) | 3.00 | 3.61 | 2.76 | 2.41 | 3.42 | 3.08 | 3.52 | 3.87 | 4.50 | 4.97 |
| Pull-off force (MPa) | 11.1 | 10.8 | 10.8 | 15.1 | 11.2 | 10.6 | 8.5 | 15.8 | 14.2 | 15.3 |

As can be seen from the above various test results, the coating composition of the present disclosure can decrease the density of the zinc rich epoxy coating and reduce the amount of zinc powders, meanwhile obtaining the significant improvements in terms of drying property and corrosion resistance (Salt Spray Resistance Test, Humidity and Heat Resistance Test and Cyclic Aging Test) by optimizing the ratios between metallic salts of phosphorous acid, petroleum resins and epoxy resins, and, in certain cases, by further adding hollow glass microspheres.

It will be appreciated by skilled artisans that modifications may be made to the present disclosure without departing from the concept disclosed in the foregoing description. Accordingly, it is to be understood that specific aspects detailed herein are merely illustrative and not to limit the present disclosure. The present disclosure would be entailed the entire scope of the appended claims and their entire equivalents.

What is claimed is:

1. A coating composition, comprising:
- a resin component comprising an epoxy resin and a petroleum resin;
- zinc particles in an amount of at least 75 wt.-%, based on the total solid weight of the coating composition;
- a metallic salt of phosphorous acid; and
- a hardener,
- wherein the weight ratio of the metallic salt of phosphorous acid to zinc particles is 1:25 to 1:45.

2. The coating composition according to claim 1, wherein the coating composition contains at least 70 wt.-%, of zinc particles.

3. The coating composition according to claim 1, wherein the amount of the petroleum resin is greater than 0 up to 10 wt.-%, based on the total weight of the coating composition.

4. The coating composition according to claim 1, wherein the weight ratio of said epoxy resin to said petroleum resin is in a range of 2-10:1.

5. The coating composition according to claim 1, wherein the metallic salt of phosphorous acid comprises phosphate, phosphite, hypophosphite, hydrogen phosphate, dihydrogen phosphate, hydrogen phosphite, dihydrogen phosphite and polyphosphate, phosphates or polyphosphates modified with silicon, or mixtures thereof.

6. The coating composition according to claim 1, wherein the amount of said epoxy resin is 3 to 25 wt.-% based on the total weight of the coating composition, and/or the epoxy equivalent is 100 to 2,000 g/eqv.

7. The coating composition according to claim 1, wherein said epoxy resin includes both liquid type epoxy resin and solid type epoxy resin.

8. The coating composition according to claim 7, wherein the amount of said liquid type epoxy resin is 0.5 to 15 wt.-% and the amount of said solid type epoxy resin is 1 to 20 wt.-% based on total weight of the coating composition.

9. The coating composition according to claim 1, wherein the hardener comprises polyamine, primary or secondary diamines or polyamines, wherein the groups linked to a nitrogen atom may be saturated or unsaturated aliphatics, alicyclics, aromatics, aromatic substituted aliphatics, aliphatic substituted aromatics, heterocyclics, or mixtures thereof.

10. The coating composition according to claim 1, further comprising glass microspheres in an amount of 1 to 5 wt.-%, based on the total weight of the composition.

11. The coating composition of claim 1, wherein the epoxy resin is saturated or unsaturated, cyclic or acyclic, aliphatic, alicyclic, aromatic or heterocyclic, unsubstituted or substituted, or mixtures thereof.

12. The coating composition of claim 1, wherein the petroleum resin comprises an aliphatic or cycloaliphatic resin based on C5 or cycloaliphatic dienes, aromatic components based on C9, hydrogenated products, or mixtures thereof.

13. The coating composition claim 1, wherein the zinc particles are at least 94% pure, have an average particle size from 1 to 150 μm, are present in the coating composition in an amount of no more than 95 wt % based on the total weight of the composition, and/or are surface treated.

14. The coating composition of claim 1, wherein the composition comprises 5 wt % or less of metal particles other than zinc.

15. The coating composition of claim 1, wherein the metallic salt of phosphorus acid does not comprise an alkaline metal salt.

16. The coating composition of claim 1, further comprising a hardening promoter, a solvent, a thixotropic agent, a wetting and dispersing agent, a filler, a pigment, or mixtures thereof.

17. A substrate coated with the coating composition of claim 1.

18. The substrate of claim 17, wherein the substrate comprises iron, steel, and/or aluminum and/or alloys thereof.

19. The substrate of claim 17, wherein the substrate comprises part of a vehicle.

20. A coating composition, comprising:

a resin component comprising an epoxy resin and a petroleum resin;

zinc particles in an amount of at least 75 wt.-%, based on the total solid weight of the coating composition;

a metallic salt of phosphorous acid; and a hardener, wherein said epoxy resin includes both liquid type epoxy resin and solid type epoxy resin, and wherein the amount of said liquid type epoxy resin is 0.5 to 15 wt.-% and the amount of said solid type epoxy resin is 1 to 20 wt.-% based on total weight of the coating composition.

* * * * *